United States Patent [19]

Greskovich et al.

[11] Patent Number: 4,755,492
[45] Date of Patent: Jul. 5, 1988

[54] YTTRIUM OXIDE CERAMIC BODY

[75] Inventors: Charles D. Greskovich, Schenectady; Chester R. O'Clair, Latham, both of N.Y.

[73] Assignee: General Electric Company, Schenectady, N.Y.

[21] Appl. No.: 915,477

[22] Filed: Oct. 6, 1986

[51] Int. Cl.$^4$ ...................... C04B 35/50; B29D 11/00
[52] U.S. Cl. .................................... 501/126; 501/152; 423/263; 264/1.2; 264/65; 264/66
[58] Field of Search ................ 501/126, 152; 423/263; 264/65, 1.2, 66

[56] References Cited

U.S. PATENT DOCUMENTS

| | | | |
|---|---|---|---|
| 3,476,691 | 11/1969 | Smith et al. | 501/126 |
| 3,545,987 | 12/1970 | Anderson | 501/126 |
| 3,635,658 | 1/1972 | Ferri et al. | 423/263 |
| 3,873,657 | 3/1975 | Toda et al. | 423/263 |
| 3,878,280 | 4/1975 | Dutta et al. | 423/263 |
| 3,897,358 | 7/1975 | Greskovich et al. | 501/126 |
| 4,238,467 | 12/1980 | Dugan et al. | 423/263 |
| 4,497,785 | 2/1985 | Tilley et al. | 423/263 |
| 4,571,312 | 2/1986 | Greskovich et al. | 264/1.2 |
| 4,606,847 | 8/1986 | Woodhead | 423/263 |

FOREIGN PATENT DOCUMENTS 2018760 10/1979 United Kingdom ................ 423/263

OTHER PUBLICATIONS

Palilla et al., "The Relationships Between Powder Properties, Sintered Microstructures and Optical Properties of Translucent Yttria", from Materials Characterization for Systems Performance and Reliability, 1986.

Primary Examiner—Mark L. Bell
Assistant Examiner—Ann M. Knab
Attorney, Agent, or Firm—Jane M. Binkowski; James C. Davis, Jr.; James Magee, Jr.

[57] ABSTRACT

A sinterable yttrium oxide powder is produced useful for pressureless sintering a compact thereof into an optically translucent or transparent body. The yttrium oxide powder has a specified particle size range and specific surface area. It is formed by preparing yttrium oxalate hydrate powder by means of the wet chemical oxalate method, comminuting the yttrium oxalate hydrate powder to a required degree and calcining the yttrium oxalate hydrate.

24 Claims, 2 Drawing Sheets

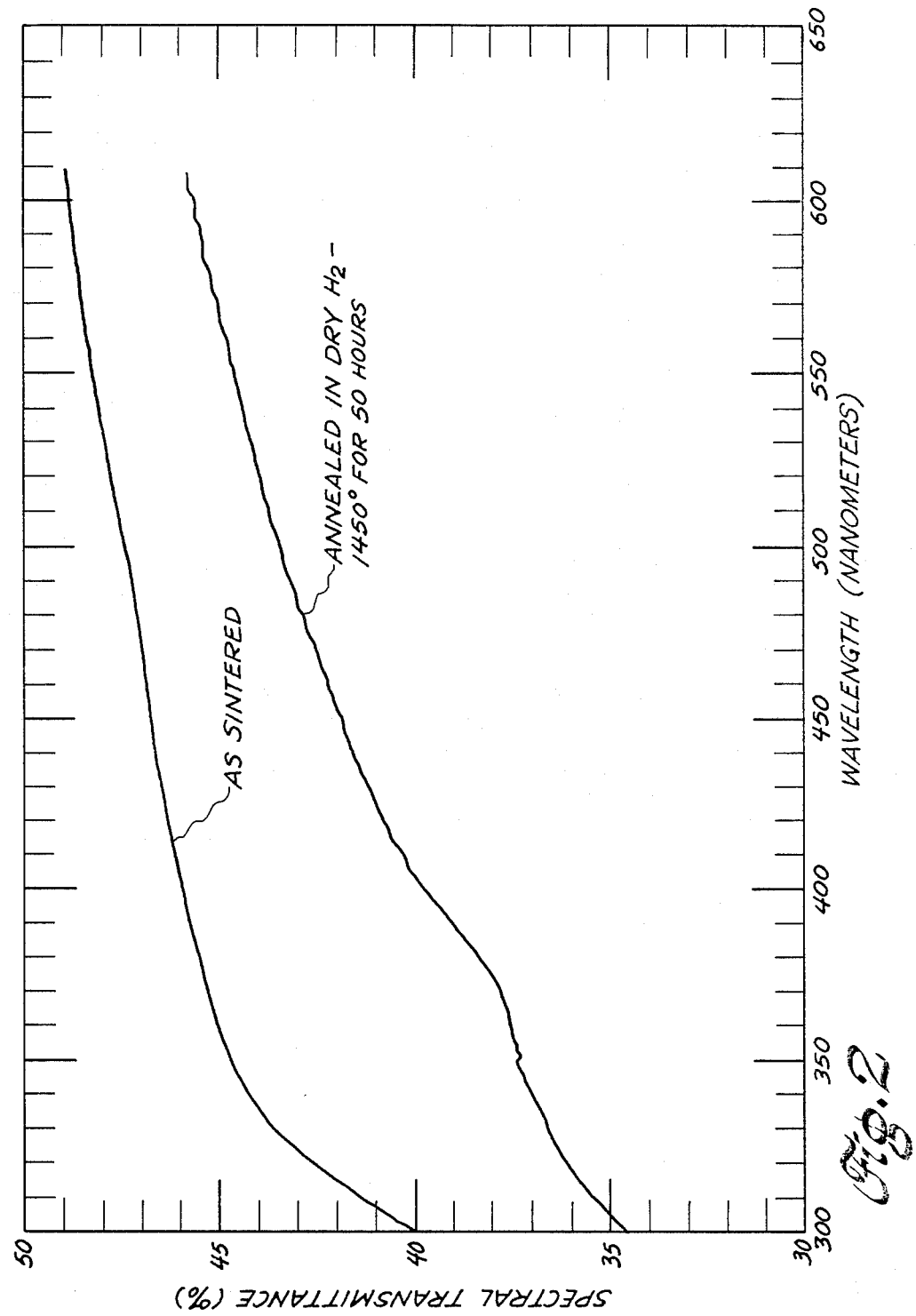

YTTRIUM OXIDE CERAMIC BODY

This invention relates to the production of an optically translucent or transparent polycrystalline yttrium oxide body.

Yttrium oxide ($Y_2O_3$) has been long considered to be an excellent candidate material for high temperature lamp envelopes provided an economical process could be used to prepare translucent or transparent bodies without darkening in the reducing conditions of a typical sodium vapor discharge lamp.

U.S. Pat. No. 3,878,280 to Dutta et al. discloses vacuum hot pressing of yttrium oxide powder without additives in a graphite die at 1300° C. to 1500° C. to produce transparent yttrium oxide having an ultrafine grain size of less than 1 micron. This patent makes no disclosure of the stability of such hot pressed product. For example, a relatively small amount of carbon introduced by the vaporization of the graphite die and locked into the pores of the hot pressed body can cause bloating when heated in air at the operating temperatures of a sodium vapor discharge lamp ranging from about 1100° C. to about 1200° C. In addition, hot pressing is not operable for producing a thin-walled hollow body of yttrium oxide such as an envelope for a metal vapor discharge lamp.

U.S. Pat. No. 3,545,987 to Anderson discloses the preparation of transparent $Y_2O_3$-based ceramics containing $ThO_2$, $ZrO_2$ or $HfO_2$ as sintering additives. These compositions make a cubic solid solution of high transparency, but they have a strong tendency to darken within several hours during use as lamp envelopes in a sodium vapor discharge lamp. This darkening problem cannot be tolerated with these $Y_2O_3$ solid solutions because these materials eventually become totally absorbing in the visible region and useless during lamp operation.

U.S. Pat. No. 3,873,657 to Toda et al. discloses the use of beryllium additives to prepare transparent $Y_2O_3$-based ceramics, but commercialization of this composition is probably not practical because of the toxic nature of the beryllium compounds.

U.S. Pat. No. 4,147,744 to Rhodes discloses a sintering process for producing a substantially transparent $Y_2O_3$-based body of $Y_2O_3$ and lanthana ($La_2O_3$). These compositions can be sintered to transparency by a special high temperature (1900°–2150° C.) heat treatment which makes use of the cubic-to-hexagonal phase transition responsible for retarding grain growth and enhancing sintering. This patent also discloses that lanthana and yttria precursors such as co-precipitated oxalates, carbonates, hydroxides and organic carboxylates may be used.

U.S. Pat. No. 4,174,973 to Rhodes discloses the incorporation of 0.1 to 5 wt. % of MgO or $MgAl_2O_4$ as a sintering aid to $Y_2O_3$ to make transparent $Y_2O_3$-based ceramics containing 0.1 to 5 wt. % of MgO or $MgAl_2O_4$. The trivalent ($Al^{3+}$) and/or divalent ($Mg^{2+}$) additives still permit good chemical stability of these sintered $Y_2O_3$ compositions toward reduction and darkening in high temperature, low oxygen environments such as those present in sodium vapor discharge lamps. However, a disadvantage of these $Y_2O_3$ ceramics containing MgO or $MgAl_2O_4$ is that residual secondary phase(s) remain in the microstructure of the sintered product and can cause an unknown amount of light scattering which degrades the overall optical quality.

The present process produces optically translucent or transparent $Y_2O_3$ ceramics without any sintering additives. The present invention eliminates the subsequent darkening problems of the $Y_2O_3$ ceramic that is usually associated with the incorporation of many of the aforementioned sintering additives. In addition, the present process permits the fabrication of complex-shaped parts (i.e., thin-walled tubes) on an economical production basis and overcomes the adverse economics and impracticality of the hot-pressing method of consolidation of $Y_2O_3$ powders.

Those skilled in the art will gain a further and better understanding of the present invention from the detailed description set forth below, considered in conjunction with the figures accompanying and forming a part of the specification, in which:

FIG. 2 shows spectral transmittance, i.e. in-line transmission, as a function of wavelength for an as-sintered body, i.e. a sintered yttrium oxide body produced in accordance with the present invention, and for the same body after it was fired in dry hydrogen at 1450° C. for 50 hours.

Figure 1:
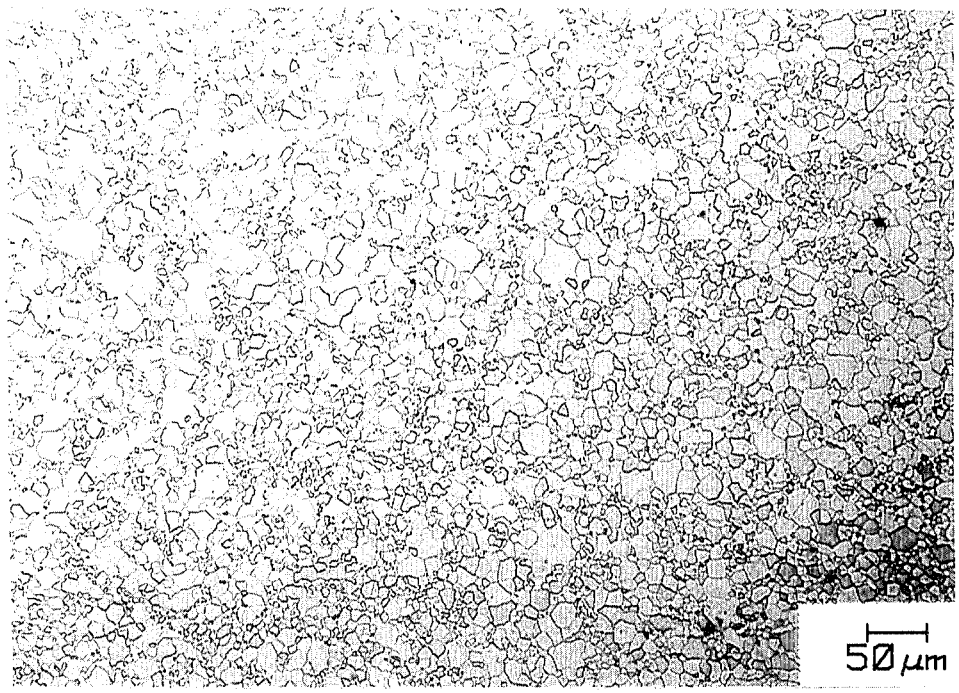
FIG. 1 is a photomicrograph (magnified 200×) showing the microstructure of a polished sintered body of yttrium oxide produced in accordance with the present invention.

In accordance with the present invention, a specific yttrium oxide powder is produced, formed into a compact and pressureless sintered to produce a polycrystalline body which is at least optically translucent and preferably which is optically transparent.

By pressureless sintering herein it is meant the densification or consolidation of the compact without the application of mechanical pressure into a ceramic body which is at least optically translucent.

The terms "translucency" and "transparency" as used herein denote various degrees of optical clarity of the present sintered product.

By an optically translucent body it is meant herein a body through which light or radiation in the visible wavelength is able to pass through sufficiently to make such body useful for optical applications such as enclosures for arc tubes.

By an optically transparent body, it is meant herein a body through which light or radiation in the visible wavelength is able to pass through sufficiently so that an object on the other side can be seen distinctly with the unaided eye, i.e., it is a body which can be seen through.

The present yttrium oxide powder is white in color and is crystalline. Generally, it has a purity of at least about 99.9% and higher, preferably at least about 99.99%, and most preferably greater than about 99.99%.

% purity herein denotes % by weight.

The present yttrium oxide powder is free of particles greater than about 5 microns in size, preferably free of particles greater than about 4 microns, and more preferably free of particles greater than about 3 microns. Also, the present yttrium oxide powder has an average particle size of less than about 5 microns, preferably less than about 4 microns, and more preferably less than about 2 microns. Generally, it has an average particle size ranging from about 1 micron up to about 5 microns, preferably from about 1 micron up to about 4 microns, and typically, the average particle size ranges from about 1 micron to about 1.5 microns. Average particle size is determinable in a standard manner by measurement of the particle size distribution.

An yttrium oxide particle herein is defined as consisting essentially of a cluster of smaller size crystals weakly bonded together autogeneously, i.e., such bonding is believed to be caused by Van der Waal's forces or by self-bonding.

The present yttrium oxide powder generally has a specific surface area ranging from about 4 to about 25 square meters per gram, preferably from about 5 to about 15 square meters per gram, and typically, it ranges from about 6 to about 10 square meters per gram.

By specific surface area or surface area of a powder herein, it is meant the specific surface area according to BET surface area measurement.

Briefly stated, the present yttrium oxide powder is produced by providing yttrium oxalate hydrate, comminuting said yttrium oxalate hydrate to produce a powder comprised of agglomerates having an average agglomerate size of less than about 20 microns and which is free of agglomerates greater than about 20 microns, and thermally decomposing the comminuted yttrium oxalate hydrate to produce yttrium oxide.

Briefly stated, in a more specific embodiment, the present yttrium oxide powder is produced by a process which comprises providing an aqueous yttrium nitrate solution of at least about 0.1 mole of yttrium per liter of solution, providing an aqueous oxalic acid solution having a concentration of at least about 10% excess of that required for complete reaction with the yttrium nitrate, admixing said yttrium nitrate solution with said oxalic acid solution thereby precipitating yttrium oxalate hydrate, recovering said yttrium oxalate hydrate, washing said yttrium oxalate hydrate with water to at least substantially neutralize it, drying said yttrium oxalate hydrate to remove adsorbed water, comminuting said yttrium oxalate hydrate to produce a powder wherein the average agglomerate size is less than about 20 microns and which is free of agglomerates having a size greater than about 20 microns, and thermally decomposing said yttrium oxalate hydrate at a temperature ranging from about 650° C. to about 1000° C. in air at ambient pressure to produce said yttrium oxide powder.

By ambient pressure herein, it is meant atmospheric or about atmospheric pressure.

By ambient temperature herein, it is meant at or about room temperature, i.e. at or about 21° C.

The present yttrium oxalate hydrate is produced by the wet chemical oxalate method. In this method, yttrium nitrate solution is admixed with oxalic acid solution to precipitate yttrium oxalate hydrate.

The yttrium nitrate solution can vary in concentration and generally ranges from about 0.5 moles to about 3 moles of yttrium, preferably about 1 mole of yttrium, per liter of solution. The yttrium nitrate solution can be formed by a number of conventional techniques. Preferably, it is formed by dissolving yttrium oxide powder, preferably having a purity of at least about 99.9% or higher, in a mixture of distilled or deionized water and concentrated nitric acid. Alternatively, the yttrium nitrate solution can be formed by dissolving yttrium nitrate, preferably having a purity of at least about 99.9% or higher, in distilled or deionized water.

The oxalic acid solution can be formed by dissolving oxalic acid preferably having a purity of at least about 99.9% or higher in distilled or deionized water. The oxalic acid solution can vary in concentration and generally it ranges from about 0.5 to about 1.0 mole of oxalic acid, preferably about 0.8 mole, per liter of solution. Preferably, oxalic acid in excess of that stoichiometrically required to complete reaction is used to ensure complete reaction.

The yttrium nitrate solution and oxalic acid solution are admixed to precipitate yttrium oxalate hydrate. Such mixing can be carried out in a conventional manner and preferably it is carried out at ambient pressure and temperature. The formation of yttrium oxalate hydrate is illustrated by the following reaction:

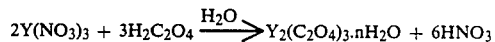

$$2Y(NO_3)_3 + 3H_2C_2O_4 \xrightarrow{H_2O} Y_2(C_2O_4)_3 \cdot nH_2O + 6HNO_3$$

where n can typically vary from about 4 to about 10.

The yttrium oxalate hydrate, i.e. precursor, can be recovered by a number of conventional techniques. Preferably, it is collected into a filter cake by centrifuging or by vacuum filtration. The precursor is washed generally with distilled or deionized water or methyl alcohol to remove acid therefrom to produce a substantially neutralized material, i.e. a material generally having a pH ranging from about 5 to about 7. The neutralized material can be collected in a conventional manner, preferably by vacuum filtration or centrifuging.

The collected neutralized material is dried preferably in air to remove excess water therefrom, i.e., water physically adsorbed thereon. Typically, it is dried in flowing air at a temperature ranging from about 110° C. to about 125° C. for a period of time determinable empirically generally ranging from about 12 hours to about 24 hours.

The dried yttrium oxalate hydrate is a white fluffy powder and is comprised of agglomerates. X-ray diffraction analysis of the yttrium oxalate hydrate powder indicates that it has some degree of crystallinity.

The yttrium oxalate hydrate powder is comminuted to reduce its agglomerate size, especially to significantly reduce the fraction of its larger sized agglomerates. Specifically, the yttrium oxalate hydrate powder is comminuted to produce a powder which, when calcined, will produce the present yttrium oxide powder. Such comminution is determinable empirically. Generally, the yttrium oxalate hydrate powder is comminuted to produce a powder comprised of agglomerates having an average size which is less than about 20 microns and which is free of agglomerates greater than about 20 microns in size. Preferably, the yttrium oxalate hydrate powder is comminuted to produce a powder having an average agglomerate size of less than about 10 microns and free of agglomerates greater than about 15 microns in size. Specifically, the comminuted precursor powder is of an average size which is approximately or roughly about three times larger than the size desired of the resulting yttrium oxide powder. Generally, the comminuted yttrium oxalate hydrate powder has a specific surface area ranging from about 3 to about 10 square meters per gram and typically it ranges from about 4 to about 6 square meters per gram.

Comminution of the precursor powder can be carried out by a number of conventional techniques which do not introduce contaminants into the powder which would prevent production of the present optically translucent sintered body. Comminution time varies widely and depends largely on the amount and particular size reduction desired and type of equipment used. Generally, the precursor powder is comminuted in air at ambient temperature. Preferably, the precursor powder is air milled, i.e. fluid energy milled. When the powder is fluid energy milled, it is preferably homogenized to attain substantially uniform size distribution in a conventional manner such as, for example, by tumbling or blending in a plastic jar. Also, preferably, such blended powder is screened through a 10 to 20 mesh nylon screen to reduce the size of any large agglomerates which might have formed during blending.

In a preferred embodiment of the present invention, before drying of the collected neutralized yttrium oxalate hydrate precipitate, or before comminution of the dried yttrium oxalate hydrate powder, it is dispersed, i.e. deflocculated, in an aqueous solution of a basic dispersant preferably formed with distilled or deionized water. The dispersant should be one which effectively disperses the precursor powder into a suspension and has no significant deleterious effect on the present sintered product. Preferably, the dispersant is removed by water-washing, leaving no significant amount thereof, preferably leaving no amount thereof which is detectable by standard techniques. Representative of a useful dispersant is an organic hydroxide, preferably an organic ammonium hydroxide. Most preferably, the dispersant is tetramethylammonium hydroxide (TMAH).

The concentration of dispersant solution and period of time that the precursor powder is dispersed in the dispersant solution is determinable empirically. This treatment of the precursor powder with dispersant solution is preferably carried out at ambient temperature and pressure and significantly improves the clarity of the resulting sintered body. Generally, from about a 0.1 volume % to about a 10 volume %, preferably from about a 2 volume % to about a 6 volume %, and most preferably from about a 3 volume % to about a 4 volume % solution of dispersant is useful. Preferably, the precursor powder is stirred in the dispersant solution, usually for about less than 1 hour, generally from about ten minutes to about 40 minutes, and typically for about 30 minutes.

The dispersed precursor powder can be flocculated in a conventional manner by adding an acid to the suspension. The acid should be one which is an effective flocculant and which has no significant deleterious effect thereon. The amount of acid flocculant is determinable empirically and preferably should be just sufficient to flocculate the precursor powder. Preferably, the acidic flocculant is an aqueous solution of oxalic acid which is added to the suspension until flocculation takes place.

The flocculated precursor powder can be recovered in a conventional manner. Preferably, it is collected by means of vacuum filtration or centrifuging. The recovered precursor powder is washed preferably with distilled or deionized water to remove the acid therefrom and produce a substantially neutralized material, i.e. a material generally having a pH ranging from about 5 to about 7. The neutralized material can be recovered in a standard manner and preferably it is collected into a cake by centrifuging or vacuum filtration. If desired, washing and centrifuging can be carried out by means of centrifuging.

The washed precursor powder is dried preferably in air to remove adsorbed water therefrom. Typically, it is dried in flowing air at a temperature ranging from about 110° C. to about 125° C. for a period of time determinable empirically and generally ranging from about 12 hours to about 24 hours. The resulting dried powder is then ready to be comminuted.

The comminuted precursor powder is thermally decomposed, i.e. calcined, to produce the present yttrium oxide powder. Calcining of the comminuted precursor powder is carried out in air at ambient pressure at a temperature ranging from about 650° C. to about 1000° C., preferably from about 750° C. to about 850° C., and most preferably it is about 800° C. At a temperature below about 650° C., the decomposition of the precursor may not be complete, and above 1000° C., large hard aggregates may form that can reduce translucency. Calcining time is determinable empirically, for example, by weight loss. Calcining is completed when there is no more weight loss on further firing. Generally, calcining time ranges from about one hour to about four hours.

The present thermal decomposition of yttrium oxalate hydrate is illustrated by the following reaction:

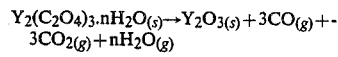

where (s) represents a solid product and (g) represents a gaseous product.

Briefly stated, the present process for producing a polycrystalline yttrium oxide body which is at least optically translucent comprises forming the present yttrium oxide powder into a compact having a density of at least about 45% of the theoretical density for yttrium oxide, and sintering said compact at a temperature ranging from about 1625° C. to about 2000° C. in an atmosphere of wet hydrogen, or in an atmosphere of dry hydrogen until the sintered body has become a closed pore body followed by sintering or firing it in wet hydrogen. Generally, the firing or sintering atmosphere is at or about ambient pressure.

A number of techniques can be used to shape the yttrium oxide powder into a compact, i.e. green body. For example, it can be extruded, injection molded, die-pressed, isostatically pressed or slip cast to produce the green body of desired shape. The compact can vary in form and size and can be simple, hollow and/or complex shape. Any lubricants, binders or similar materials used in shaping the powder should have no significant deleterious effect on the resulting sintered body. Such materials are preferably of the type which evaporate on heating at relatively low temperatures, preferably below 500° C., leaving no significant residue. The green body should have a density of at least about 45%, preferably greater than about 45%, more preferably greater than about 50% and most preferably greater than about 55% of the theoretical density of 5.03 g/cc for yttrium oxide to promote densification during sintering and achieve attainment of the present optically translucent sintered body.

Preferably, before sintering, the green body or compact is prefired in an oxygen-containing atmosphere such as air at a temperature below 1000° C., generally ranging from about 500° C. to below 1000° C., to eliminate impurities including shaping aids which would have a significant deleterious effect on the optical translucency of the sintered body. The particular prefiring temperature and prefiring period is determinable empirically and depends largely on the level of impurities present and on the thickness of the body, and generally ranges from about 1 to 5 hours. Such prefiring allows the sintering atmosphere to be free of impurities, and imparts sufficient strength to the compact allowing it to be more easily handled and machined.

The green or prefired body is fired in an atmosphere of hydrogen to produce the present sintered body. At least at some stage of the firing of the body, the hydrogen atmosphere should be provided with at least a sufficient oxygen partial pressure to produce and maintain the present optically translucent sintered body. Such oxygen partial pressure is determinable empirically.

In one embodiment of the present invention, the green or prefired body is fired in an atmosphere of wet hydrogen to produce the present sintered body. The wet hydrogen atmosphere should contain at least a sufficient partial pressure of oxygen to produce and maintain the present optically translucent body, i.e. to prevent discoloration of the sintered body in the present process, and is determinable empirically. Specifically, the wet hydrogen atmosphere is chosen to be reducing to the furnace elements which might be tungsten or molybdenum in a refractory metal furnace and should be slightly oxidizing to the sample being sintered so that it will not be discolored or darkened by too low an oxygen partial pressure, i.e. too much of a reducing atmosphere. Such a wet hydrogen atmosphere can be provided by incoming hydrogen gas having a dewpoint temperature ranging from about 0° C. to about 25° C., and preferably from about 15° C. to about 22° C. Such incoming wet hydrogen gas determines how much oxygen will be in the furnace atmosphere at any particular firing temperature. In the present sintering temperature range, the oxygen partial pressure in the sintering atmosphere generally ranges from about $10^{-8}$ to about $10^{-13}$ atmospheres.

In a preferred embodiment of the present process, the green or prefired compact is fired initially in an atmosphere of dry hydrogen until the sintered body becomes at least a closed pore body followed by firing in an atmosphere of wet hydrogen. Generally, the present dry hydrogen atmosphere is provided by incoming hydrogen gas having a dewpoint temperature ranging from about $-50°$ C. to about $-60°$ C. Generally, the present dry hydrogen atmosphere has an oxygen partial pressure at sintering temperature of less than about $10^{-20}$ atmosphere. When the sintered body becomes a closed pore body, at which point it typically has a density ranging from about 92% to about 96%, or preferably when the sintered body has a density higher than that of the closed pore body, more preferably when the sintered body has a density of at least about 99%, and most preferably when the sintered body has a density greater than about 99.9%, an atmosphere of wet hydrogen is introduced. The wet hydrogen atmosphere is used to remove or substantially remove discoloration of the sintered body caused by firing in dry hydrogen and to complete any remaining sintering of the body. Therefore, such a wet hydrogen atmosphere should contain at least a sufficient partial pressure of oxygen to remove or at least substantially remove the discoloration of the sintered body caused by dry hydrogen, i.e. to produce and maintain the present optically translucent body, and is determinable empirically. Generally, such a wet hydrogen atmosphere can be provided by incoming hydrogen gas having a dewpoint temperature ranging from about 0° C. to about 25° C., preferably from about 15° C. to about 22° C. Generally, a sintered body with significantly increased clarity is produced by firing initially in the dry hydrogen atmosphere to the closed pore stage followed by the firing in wet hydrogen. Generally, the firing or sintering atmosphere is at or about ambient pressure.

The present sintering temperature, i.e. maximum firing temperature, ranges from about 1625° C. to about 2000° C., preferably from about 1700° C. to about 1900° C., and more preferably from about 1725° C. to about 1800° C. Sintering temperatures lower than about 1625° C. either would require too long a period of sintering time to be practical or are not operable to produce the present product. On the other hand, temperatures higher than about 2000° C. produce a sintered body with no significant advantages in optical quality but with the disadvantage of grains that are too large thereby rendering it with poor strength.

The rate of heating to sintering temperature can vary and should have no significant deleterious effect on the body. Generally, heating rates can range from about 100° C. per hour up to about 700° C. per hour, and usually from about 200° C. per hour to about 400° C. per hour. An intermediate soak time of about 5 to 10 hours at temperatures between 1700° and 1800° C. has been found useful in providing sintered bodies with high translucency/transparency. This intermediate soaking period is carried out in the sintering furnace during the sintering cycle, unless sintering temperatures are lower than about 1700° C.

The particular time period at the maximum firing temperature depends largely on such temperature and is determinable empirically. Specifically, increasing sintering or firing temperature requires less sintering or firing time. Generally, however, where only a wet hydrogen atmosphere is used, a sintering temperature of about 1700° C. requires a sintering time period of about 8 hours, and a sintering temperature of about 1900° C. requires a sintering time period of about 2 hours to produce the present sintered body.

The sintered body is cooled, i.e. the firing temperature is reduced, preferably to ambient temperature, under conditions which have no significant deleterious effect thereon. Preferably it is cooled in a wet hydrogen atmosphere, i.e. an atmosphere provided by incoming hydrogen gas having a dewpoint temperature ranging from about 0° C. to about 25° C. Generally, cooling rate is less than about 1500° C. per hour, and usually range from about 500° C. per hour to about 1000° C. per hour.

The present sintered body consists essentially of cubic yttrium oxide phase as determined by X-ray diffraction and electron microscope measurements. The present sintered body has a microstructure with an average grain size generally ranging from about 5 microns to about 250 microns. In one embodiment, the present sintered body has an average grain size ranging from about 10 microns to about 100 microns, in another embodiment the average grain size ranges from about 5 microns to about 50 microns, and still in another embodiment it ranges from about 5 microns to about 20 microns. The grains are cubic in symmetry, as ascertained by X-ray diffraction studies.

Generally, the present sintered body has a density of at least about 99.7%, usually at least about 99.8%, preferably at least about 99.9%, and more preferably greater than about 99.9%.

In the present invention, unless otherwise stated, the density of the sintered body as well as that of the green body or compact is given as a fractional density of the theoretical density of yttrium oxide (5.03 g/cc).

The present sintered body is at least optically translucent. More specifically it has an in-line spectral transmission at least greater than 1%, preferably at least about 2%, more preferably at least about 3%, still more preferably at least about 10%, and most preferably at least about 20%, all values taken at a wavelength of 590 nm.

By the term "in line spectral transmission" used herein, it is meant the ratio of the intensity of transmitted light to the intensity of incident light, obtained when parallel light of a certain intensity is incident perpendicular to the surfaces of a sample of a certain thickness. In the present invention, the in-line spectral transmission was determined on a polished plate of the present sintered body of a thickness of 0.85 millimeter at a wavelength of 590 nanometers. In the present invention, at an in-line transmission of about 2%, the present sintered body is optically transparent.

The present sintered body is stable, i.e. it does not exhibit bloating in air at temperatures of up to about 1300° C.

The present invention makes it possible to fabricate simple, hollow and/or complex shaped polycrystalline yttrium oxide articles directly. Specifically, the present sintered product can be produced in the form of a useful simple, hollow and/or complex shaped article without machining, or without significant or substantial machining, such as a thin walled tube, a long rod, a spherical body or a hollow shaped article.

The present sintered body has a wide variety of uses. It is useful in any system where a ceramic protective material or plate having the present light-transmitting properties is needed. Specifically, it is useful as a light-transmitting filter or light-transmitting window for infrared domes and solar cells. It is especially useful as a lamp envelope for a metal vapor discharge lamp such as a sodium vapor discharge lamp. Such a lamp envelope usually has a wall thickness ranging from about ½ to about 1 millimeter.

The invention is further illustrated by the following examples wherein the procedure and materials were as follows unless otherwise stated:

The yttrium oxalate hydrate powder used in all of the examples was prepared in substantially the same manner. Specifically, 160 grams of yttrium oxide powder of about 99.99% purity was added to 1120 cc of distilled water to which 320 cc of concentrated nitric acid was added. The mixture was heated with stirring until a clear yttrium nitrate solution was formed. The solution was concentrated by boiling down to about 700 cc of volume and vacuum filtered. Then 400 grams of oxalic acid with a purity of about 99.9% was dissolved in 4.8 liters of distilled water at room temperature and vacuum filtered. The yttrium nitrate solution was rapidly dripped into the stirred oxalic acid solution at ambient temperature thereby precipitating yttrium oxalate hydrate. When the precipitation was completed, the precipitate was recovered by decantation and substantially neutralized by washing it with distilled water. The pH of the final wash water was about 5.5. The precipitate was collected by vacuum filtration and oven dried for about 23 hours at about 110° C. X-ray diffraction analysis of the yttrium oxalate hydrate powder showed it to have a number of diffraction lines of a complex structured material that has some degree of crystallinity. A portion of this as-prepared powder was used to produce the yttrium oxide powder in Example 8.

In Examples 1–5 and 7, the as-prepared yttrium oxalate hydrate powder was treated with an aqueous solution of tetramethylammonium hydroxide (TMAH) in substantially the same manner. Specifically, 100 grams of the yttrium oxalate hydrate powder was stirred into 300 cc of distilled water and soaked with stirring at ambient temperature for about 25 minutes. A 3 volume % aqueous solution of TMAH was stirred into the mixture causing the yttrium oxalate hydrate to deflocculate. After about 30 minutes of stirring of the mixture at ambient temperature, an aqueous oxalic solution was added to flocculate the yttrium oxalate hydrate. The hydrate was recovered by decantation and washed with distilled water at ambient temperature to substantially neutralize it. It was then vacuum filtered and oven dried at about 110° C. A portion of this powder was used to produce the yttrium oxide powder in Example 7.

In Examples 1–5, the TMAH-treated yttrium oxalate hydrate powder was air milled. In Example 6, the yttrium oxalate hydrate powder was not treated with TMAH but it was air milled. Air milling, i.e. fluid energy milling, was carried out at ambient temperature in substantially the same manner in all of the examples. Specifically, the yttrium oxalate hydrate powder was milled by passing it through a standard fluid energy mill two times. The milled powder was then blended by tumbling at ambient temperature for about 20 to 30 minutes in a plastic jar. It was when screened through a −20 mesh nylon screen. This processed powder was used to produce the yttrium oxide powder.

Thermal decomposition, i.e. calcining, of the yttrium oxalate hydrate powder was carried out in flowing air at ambient pressure at temperatures ranging from about 820° C. to about 850° C. for periods of time ranging from about 1.5 to about 2 hours.

Size distribution of the powders was determined on a Horiba Model #CAPA-500 particle analyzer. Size analysis was carried out in the same manner. Specifically, the powder was dispersed ultrasonically for 2½ minutes in a weakly basic distilled water solution prior to particle size measurement.

The yttrium oxide powder was formed into a compact, i.e. disk, in substantially the same manner at ambient temperature to produce compacts of substantially the same size having a density ranging from about 50% to about 60% of theoretical density. Specifically, 1.5 grams of the yttrium oxide powder was die pressed into a disk under a pressure of about 28 MPa and then isostatically pressed at 420 MPa, producing green compacts in the form of disks 2.5 cm in diameter and 0.14 cm thick.

Firing and sintering of the compact was carried out in a tungsten resistance furnace.

The compact was placed on a tungsten setter and placed in the furnace and sintered on a sintering schedule. Specifically, in all of the examples, except Example 5, the compact was heated at a rate of 390° C. per hour to 1725° C., held for 8 hours at 1725° C., and then heated at a rate of 390° C. per hour to the given sintering temperature. In Example 5, a heating rate of 390° C. per hour to the sintering temperature of 1660° C. was used. All of the sintered bodies were cooled at a rate of about 975° C. per hour to ambient temperature.

All of the examples in Table I were carried out in an atmosphere of hydrogen at or about ambient pressure.

In Examples 1 and 7–9, the furnace atmosphere was wet hydrogen.

In Examples 2–4 and 6, the furnace atmosphere was initially dry hydrogen and the wet hydrogen atmosphere was not introduced until after the given sintering treatment in the dry hydrogen atmosphere.

The furnace was provided with a wet hydrogen atmosphere by incoming hydrogen gas having a dewpoint temperature ranging from about 20° C. to about 22° C.

The furnace was provided with a dry hydrogen atmosphere by incoming dry hydrogen gas having a dewpoint ranging from about −50° C. to about −60° C.

The flow rate of incoming hydrogen gas was about 10 cubic feet per hour.

The compacts were sintered under the given sintering conditions in Table I.

Density of the sintered body was determined before it was polished and was determined by water displacement using Archimedes method.

Each sintered disk was polished in a standard manner using 0.3 micron aluminum oxide paste. Each disk was polished so that both of its large faces were substantially smooth, flat and parallel to each other. The final thickness of each polished disk was 0.85 millimeters.

Spectral transmittance, i.e. in-line spectral transmission, of the polished disks was measured in a standard manner on a Perkin-Elmer Model 330 spectrometer at a wavelength of 590 nanometers in the visible wavelength.

Average grain size of the sintered body was determined in a standard manner. Specifically, the polished disk was chemically etched with a 50% solution of hydrochloric acid and water for 30 seconds to reveal the grains. The average grain size was then determined by the lineal intercept method.

The examples are illustrated in Table I.

The microstructure of the sintered body of Example 4 is illustrated in FIG. 1.

The spectral transmittance of the polished sintered body of Example 4 is illustrated by the graph in FIG. 2 labelled as-sintered. The polished sintered body was then annealed in an atmosphere of dry hydrogen at 1450° C. (oxygen partial pressure of $\approx 10^{-20}$ atm.) for 50 hours and its spectral transmittance was again determined and is shown in FIG. 2. FIG. 2 illustrates that the severe annealing in hydrogen only slightly reduced the spectral transmittance in the visible region of the electromagnetic spectrum. Specifically, FIG. 2 shows that there is only about a 3% drop in light transmittance from 48.7 to 45.4 for the transparent yttrium oxide with good optical quality. The resistance to darkening makes the present sintered yttrium oxide body useful for special optical elements of complex shape (i.e. thin-walled tubes) at low and high temperatures in severe environments.

In Example 5, sintering was carried out at a relatively low temperature in an atmosphere of wet hydrogen producing an optically transparent body which was not as transparent as those produced in Examples 1–4.

In Example 6, the comminuted yttrium oxalate hydrate powder had an average agglomerate size of 2.8 microns and was free of agglomerates greater than 13 microns. The resulting yttrium oxide powder had an average particle size of 1.3 microns with no particles larger than 3.5 microns. The resulting polished sintered body in Example 6 was optically transparent. However,

TABLE I

| Example No. | Processing of Precursor Powder | Sintering Conditions | % Spectral Transmittance (590 nm) | Relative Density (%) | Average Grain Size (microns) |
|---|---|---|---|---|---|
| 1 | TMAH Treatment + Fluid Energy Milling | 2 hr-1950° C.-wet $H_2$ | 20.5 | 99.9 | 150 |
| 2 | TMAH Treatment + Fluid Energy Milling | 2 hr-1950° C. (1 hr in dry $H_2$, 1 hr in wet $H_2$) | 60.0 | 99.9 | 230 |
| 3 | TMAH Treatment + Fluid Energy Milling | 8 hr-1725° C. (6 hr in dry $H_2$, 2 hr in wet $H_2$) | 21.6 | 99.9 | 6 |
| 4 | TMAH Treatment + Fluid Energy Milling | 3 hr-1800° C. (1 hr in dry $H_2$, 2 hr in wet $H_2$) | 45.2 | 99.9 | 13 |
| 5 | TMAH Treatment + Fluid Energy Milling | 2 hr-1660° C.-wet $H_2$ | 2 | 99.8 | 4 |
| 6 | Fluid Energy Milling | 3 hr-1870° C. (2 hr in dry $H_2$, 1 hr in wet $H_2$) | 3 | 99.9 | 20 |
| 7 | TMAH Treatment | 2 hr-1950° C.-wet $H_2$ | 0.4 | 99.6 | 70 |
| 8 | None | " | 0.1 | 99.7 | 25 |
| 9 | 99.99% $Y_2O_3$ | " | 0.1 | — | — |

In Examples 1–5, the processed yttrium oxalate hydrate powder had an average agglomerate size of 3.1 microns with no agglomerates larger than 16 microns, and the resulting yttrium oxide powder had an average particle size of 1.1 microns with no particles larger than 4.3 microns.

Specifically, in Example 1, the compact was sintered for two hours at 1950° C. in wet hydrogen and the resulting polished sintered body was optically transparent.

In Examples 2–4, where the compacts were initially sintered in dry hydrogen followed by sintering in wet hydrogen for the given times at the given temperature, all of the resulting polished sintered bodies were optically transparent, i.e. an image was visible when the polished disk was placed on printed words. A comparison of Examples 2–4 with Example 1 illustrates the improved optical transparency obtainable when initially sintering in dry hydrogen followed by firing in wet hydrogen.

its transparency was not as high as that of Example 4 where the yttrium oxalate hydrate powder was also treated with TMAH illustrating the importance of treatment of the yttrium oxalate hydrate powder with dispersant.

The processed yttrium oxalate hydrate powder in Examples 1–5 had a specific surface area of about 4.5 square meters per gram and the resulting yttrium oxide powder had a specific surface area of about 7 square meters per gram.

X-ray diffraction analysis of the sintered bodies of Examples 1–6 showed all of them to be cubic polycrystalline materials having a lattice parameter of 10.6034±0.0003Å, typical of pure $Y_2O_3$.

Examples 1–6 illustrate the present invention. The sintered bodies produced in Examples 1–6 have a wide variety of uses and are especially useful as lamp envelopes, especially as lamp envelopes for sodium vapor discharge lamps.

In Example 7, where the yttrium oxalate hydrate was not air milled, the resulting yttrium oxide powder had an average particle size of 1.2 microns with 12% of the yttrium oxide particles being larger than 5 microns. The resulting polished sintered body was opaque, illustrating the importance of the present comminution of the yttrium oxalate hydrate powder to produce the present yttrium oxide powder.

In Example 8, where the yttrium oxalate powder was not treated with TMAH or air milled, the powder had an average agglomerate size of 3.3 microns with no agglomerates larger than 13 microns, but the resulting yttrium oxide powder had an average particle size of 1.2 microns with about 12% by volume of the particles being greater than 5 microns. The resulting polished sintered body was opaque illustrating the criticality of the present processing of the yttrium oxalate hydrate powder.

In Example 9, commercially available yttrium oxide powder was used which had an average particle size of 2.7 microns with about 30% by volume of the particles being large than 5 microns. The resulting polished sintered body was opaque.

EXAMPLE 10

A polished sintered body was produced substantially as disclosed in Example 1.

The sintered body was fired in air at 1300° C. for 4 hours.

The fired body was free of bloating or any density reduction, and remained transparent.

What is claimed is:

1. A process for producing a sintered yttrium oxide body which is at least optically translucent having an in-line spectral transmission greater than 1% taken at a wavelength of 590 nanometers on a thickness of 0.85 millimeter of said sintered body and having an average grain size ranging from about 5 microns to about 50 microns which consists essentially of producing an yttrium oxide powder having an average particle size of less than about 5 microns and being free of particles greater than about 5 microns and having a specific surface area ranging from about 4 square meters per gram to about 25 square meters per gram, forming said powder into a compact having a density of at least about 45% of the density for yttrium oxide, firing said compact at a temperature ranging from about 1625° C. to about 1900° C. for a time sufficient to produce said sintered body, and reducing the firing temperature at a rate which has no significant deleterious effect on said sintered body, said firing being carried out in an atmosphere of hydrogen, said hydrogen atmosphere containing at least a sufficient partial pressure of oxygen at least after said compact becomes a closed pore body to produce said optically translucent sintered body, said yttrium oxide powder being produced by providing an aqueous yttrium nitrate solution of at least about 0.1 mole of yttrium per liter of solution, providing an aqueous oxalic acid solution having a concentration of at least about 10% excess of that required for complete reaction with said yttrium nitrate, admixing said solutions thereby precipitating yttrium oxalate hydrate, recovering said yttrium oxalate hydrate precipitate, washing said yttrium oxalate hydrate precipitate with water to substantially neutralize it, drying said yttrium oxalate hydrate precipitate to remove adsorbed water, comminuting the resulting yttrium oxalate hydrate powder in air at ambient temperature to produce a powder wherein the average agglomerate size is less than about 20 microns and which is free of agglomerates having a size greater than 20 microns, and thermally decomposing said yttrium oxalate hydrate at a temperature ranging from about 650° C. to about 1000° C. in air at ambient pressure to produce said yttrium oxide powder, said yttrium oxalate hydrate powder being comminuted sufficiently to produce on said thermal decomposition said yttrium oxide powder.

2. The process according to claim 1 wherein said firing is carried out in an atmosphere of wet hydrogen.

3. The process according to claim 1 wherein said firing is initially carried out in an atmosphere of dry hydrogen until said compact becomes a closed pore body, then said firing is carried out in an atmosphere of wet hydrogen.

4. The process according to claim 1 wherein said temperature ranges from about 1700° C. to about 1900° C.

5. The process according to claim 1 wherein said yttrium oxide powder has a specific surface area ranging from about 6 square meters per gram to about 10 square meters per gram.

6. The process according to claim 1 wherein said neutralized yttrium oxalate hydrate precipitate is deflocculated in an aqueous solution of a basic dispersant before it is dried.

7. The process according to claim 1 wherein said neutralized yttrium oxalate hydrate precipitate is deflocculated in an aqueous solution of tetramethyl ammonium hydroxide before it is dried.

8. The process according to claim 1 wherein before said comminuting said resulting yttrium oxalate hydrate powder is deflocculated in an aqueous solution of a basic dispersant before it is comminuted.

9. The process according to claim 1 wherein before said comminuting said resulting yttrium oxalate hydrate powder is deflocculated in an aqueous solution of tetramethylammonium hydroxide before it is comminuted.

10. A polycrystalline body which is at least optically translucent consisting essentially of yttrium oxide, said body having an average grain size ranging from about 5 microns to about 50 microns, said grains being cubic in symmetry said body being free of bloating in air at temperatures at least up to 1300° C., said body having an in-line spectral transmission greater than 1% taken at a wavelength of 590 nanometers on a thickness of 0.85 millimeter of said body.

11. A polycrystalline body which is at least optically translucent consisting essentially of yttrium oxide, said body having an average grain size ranging from about 5 microns to about 50 microns, said grains being of cubic symmetry, said body being in the form of a hollow body having a wall thickness ranging from about ½ to about 1 millimeter, said body being free of bloating in air at temperatures at least up to 1300° C., said body having an in-line spectral transmission greater than 1% taken at a wavelength of 590 nanometers on a thickness of 0.85 milllimeter of said body.

12. The body according to claim 11 in the form of a lamp envelope.

13. An optically transparent polycrystalline body consisting of yttrium oxide, said body having an average grain size ranging from about 5 microns to about 50 microns, said grains being of cubic symmetry, said body being in the form of a hollow body having a wall thickness ranging from about ½ to about 1 millimeter, said body being free of bloating in air at temperatures at least up to 1300° C., said body having an in-line spectral transmission of at least about 2% taken at a wavelength of 590 nanometers on a thickness of 0.85 millimeter of said body.

14. The body according to claim 13 in the form of a lamp envelope.

15. The body according to claim 10 wherein said in-line spectral transmission is at least about 2%.

16. The body according to claim 10 wherein said in-line spectral transmission is at least about 3%.

17. The body according to claim 10 wherein said in-line spectral transmission is at least about 10%.

18. The body according to claim 10 wherein said in-line spectral transmission is at least about 20%.

19. The body according to claim 11 wherein said in-line spectral transmission is at least about 2%.

20. The body according to claim 11 wherein said in-line spectral transmission is at least about 3%.

21. The body according to claim 11 wherein said in-line spectral transmission is at least about 10%.

22. The body according to claim 11 wherein said in-line spectral transmission is at least about 20%.

23. An optically transparent polycrystalline body consisting essentially of yttrium oxide, said body having an average grain size ranging from about 5 microns to about 50 microns, said grains being cubic in symmetry, said body being free of bloating in air at temperatures at least up to 1300° C., said body having an in-line spectral transmission of at least about 2% taken at a wavelength of 590 nanometers on a thickness of 0.85 millimeter of said body.

24. The process according to claim 1 wherein said yttrium oxide powder has an average particle size ranging from about 1 micron to about 5 microns.

* * * * *